United States Patent [19]
Bellew et al.

[11] Patent Number: 5,463,816
[45] Date of Patent: Nov. 7, 1995

[54] PORTABLE PLANER WITH ADJUSTABLE CHIP DEFLECTOR

[75] Inventors: William S. Bellew, Greer; Carolyn G. Wilson, Easley, both of S.C.

[73] Assignee: Ryobi North America, Easley, S.C.

[21] Appl. No.: 240,251

[22] Filed: May 10, 1994

[51] Int. Cl.⁶ ........................................ B27C 1/10
[52] U.S. Cl. .................. 30/415; 144/252 R; 451/453
[58] Field of Search ...................... 30/124, 475, 476; 83/100; 144/114 R, 117 C, 252 R; 451/451, 453, 456

[56] References Cited

U.S. PATENT DOCUMENTS

| | | |
|---|---|---|
| 2,044,481 | 6/1936 | Manley et al. .............. 144/252 R |
| 2,583,637 | 1/1952 | Draper . | 
| 2,649,873 | 8/1953 | Reich et al. . |
| 4,485,859 | 12/1984 | Krogstad et al. . |
| 4,601,104 | 7/1986 | Zalser et al. ................... 30/475 |
| 4,932,449 | 6/1990 | Omoto . |
| 5,094,000 | 3/1992 | Becht et al. ................... 30/475 |

Primary Examiner—W. Donald Bray
Attorney, Agent, or Firm—Brooks & Kushman

[57] ABSTRACT

A portable planer for use by a user to cut chips or material from a workpiece is disclosed. The portable planer includes a chip deflector movably attached to a housing of the portable planer. The nozzle can be oriented with respect to the housing such that chips expelled from the portable planer are directed away from the user and downwardly toward a floor. Alternatively, the chip deflector can be reoriented with respect to the housing so that a collector bag or vacuum hose can be attached to the nozzle whereby chips are collected in an enclosed container rather than being freely blown. Ideally, the nozzle is swivelably attached to the housing to permit the selected positioning of the nozzle relative to the housing.

8 Claims, 3 Drawing Sheets

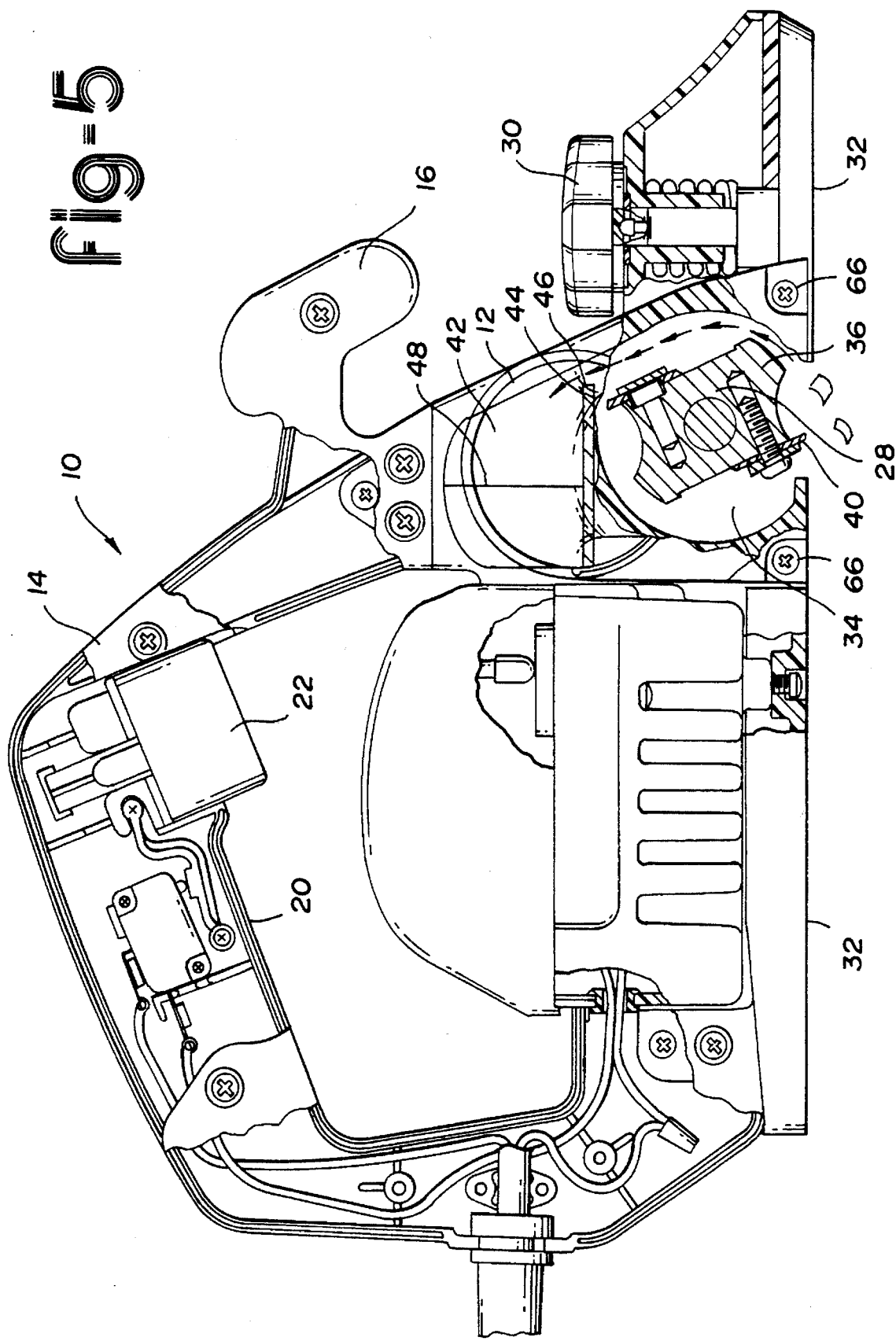

PORTABLE PLANER WITH ADJUSTABLE CHIP DEFLECTOR

TECHNICAL FIELD

The present invention relates to portable planers having chip deflectors which direct chips expelled from the planers.

BACKGROUND OF THE INVENTION

Portable planers are used to smooth uneven surfaces on workpieces by shaving high spots from the workpieces until surfaces are essentially planar. To accomplish this result, a rotating blade assembly, located in a planing chamber of a planer housing and carrying blades, is rotated above a work surface. When the blades encounter a high spot, the blades shave small amounts of material from the high spot producing shavings or chips.

The rotation of the blade assembly occurs at a relatively high number of revolutions per minute and acts as a fan creating a stream of air in the planing chamber. An outlet opening is provided in the planer housing which allows the stream of air from the planing chamber to carry chips away from the planer. Fixedly attached on the outside of the planer is a chip deflector which deflects the stream of air and shavings or chips downwardly away from a user of the planer. The shavings and chips then rapidly accumulate upon a floor or the like.

The operation of such a portable planer produces a large volume of shavings or chips. While the original workpiece may be quite compact, shaving thin slices of material from the workpiece produces elongate shavings or chips which are often curled in shaped and fluffy in texture. Consequently, the planing operation creates a large volume of waste material.

There exists a need for a portable planer in which these chips can be directed away the user of the planer, or else, can be redirected so that a vacuum or collecting bag can be readily attached to the portable planar to collect expelled chips. The present invention fulfills this need.

SUMMARY OF THE INVENTION

It is an object of the present invention to provide a portable planer which has a chip deflector adjustably mounted thereon so that the chip deflector can be selectively positionable to either direct expelled chips away from a user or else can be adjusted to facilitate the attachment of a collecting bag or vacuum hose to collect the chips.

It is another object to provide a chip deflector on a portable planer which is movably mounted to a housing of the planer such that the chip deflector can be swiveled relative to the housing to direct expelled chips in any one of a number of predetermined directions.

It is a further object to provide a method of selectively mounting a chip deflector to a housing of a portable planer wherein the chip deflector is mounted in a first position such that chips expelled from the portable planer are directed away from a user in a first determined position and then the chip deflector is repositioned relative to the housing in a second position and a vacuum hose or collecting bag is attached to the chip deflector so that expelled chips can be collected therein.

The present invention includes a portable planer carriable by a user to plane chips of material from a workpiece. The planer comprises a housing, a motor, a cutting blade assembly and a chip deflector. The housing has a first planing surface formed thereon for engaging a workpiece and also defines a planing chamber. The motor is supported by the housing. Positioned within the planing chamber is the rotatable cutting blade assembly which is driven by the motor. An exhaust port is formed in the housing and is in fluid communication with the planing chamber.

The chip deflector is movably attached to the housing and is in fluid communication with the exhaust port and planing chamber. Also, the chip deflector is selectively positionable relative to the planer housing to deflect chips expelled from the planing chamber in a plurality of predetermined directions relative to the housing.

Ideally, the chip deflector includes a nozzle which is swivelable relative to the housing. Preferably, the nozzle is selectively positioned between a first predetermined position and a second predetermined position relative to the housing. In the first position, the nozzle deflects chips downwardly and away from a user operating the planer so that chips may fall upon a floor or the like. In the second position, the nozzle is ideally positioned so that a vacuum hose or collector bag may be attached to the nozzle to collect chips without the vacuum hose or collecting bag interfering with the workpiece or planer during the planing of the workpiece. The portable planer may also include the collecting bag.

The present invention also includes a method for transforming a portable planer from a free blowing mode to a collecting mode. The method includes orienting a nozzle on a portable planer relative to a planer housing such that chips blown from the portable planer will be directed downwardly away from a user using the planer. The nozzle is then moved or reoriented relative to the planer housing. Then, a collection bag or a vacuum hose is mounted to the nozzle such that chips expelled from the nozzle are collected within either the collector bag or a vacuum cleaner.

BRIEF DESCRIPTION OF THE DRAWINGS

These and other features, objects, and advantages of the present invention will become readily apparent from the following description, pending claims, and accompanying sheets of drawings where:

FIG. 5 is side view, partially in section, of the portable planer.

BEST MODE FOR CARRYING OUT THE INVENTION

Figure 1:
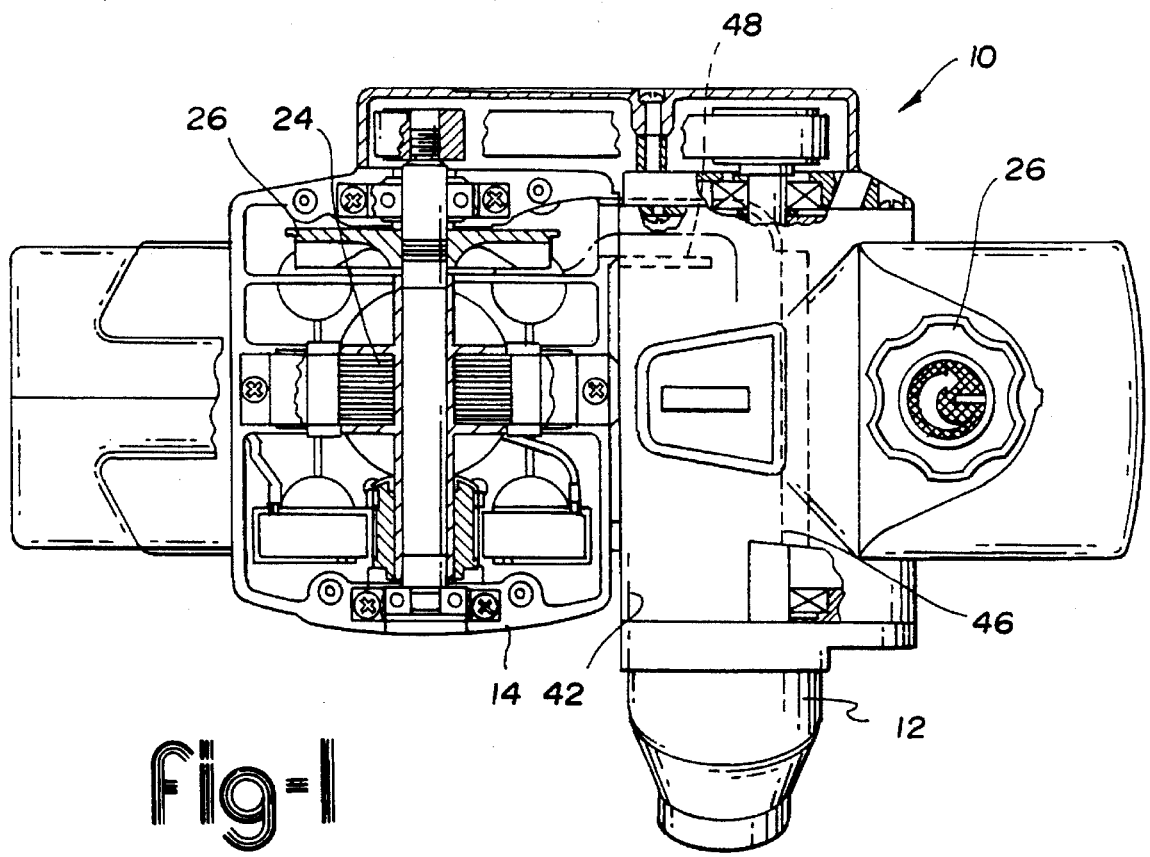
FIG. 1 is a plan view, partially in cutaway, of a portable planer having an adjustable chip deflector made in accordance with the present invention.

A portable planer 10 having an adjustable chip deflector assembly 12, made in accordance with the present invention, is shown in FIGS. 1 and 5. Portable planer 10 has a housing 14 with a first handle 16 and a second handle 20. Located adjacent second handle 20 is a trigger 22 for activating a motor 24. An impeller 26 and a cutting blade assembly 28 are rotatably driven by motor 24.

An adjustment knob 30 is located near the front of planer 10 for adjusting the height of cutting blade assembly 28 relative to a workpiece being planed. A planar engagement surface 32 is formed on the bottom of planer 10 which is slidable along the surface of a workpiece to be planed.

Housing 14 has a generally cylindrical transversely extending planing chamber 34 in which cutting blade assembly 28 is rotatably mounted. Cutting blade assembly 30 has a block 36 upon which a pair of blades 40 are mounted. When cutting blade assembly 28 is rotated, blades 40 cut chips or shavings from a workpiece during a planing operation.

A transversely extending evacuation chamber 42 is formed in housing 14 above planing chamber 34. A floor plate 44 partially separates evacuation chamber 42 from planing chamber 34 with a transverse opening 46 connecting chambers 34 and 42. Similarly, a back wall 48 partially separates impeller 26 from evacuation chamber 42. An aperture is formed in housing 14 to allow air flow between chip deflector 12 and evacuation chamber 42. Consequently, evacuation chamber 42 is in fluid communication with impeller 26, chip deflector assembly 12, and planing chamber 34.

In operation, motor 24 is activated rotatably driving impeller 26 and cutting blade assembly 28. Impeller 26 creates receives air through an inlet (not shown) and blows the air along evacuation chamber 42 and out through chip deflector 12. Concurrently, chips or shavings are cut by the rotating blades 40 of cutting blade assembly 28. These chips are evacuated from planing chamber 34 through transverse opening 46 and into evacuation chamber 42. The chips join the air blown by impeller 26 in exiting planer 10 through the chip deflector 12.

Figure 4:
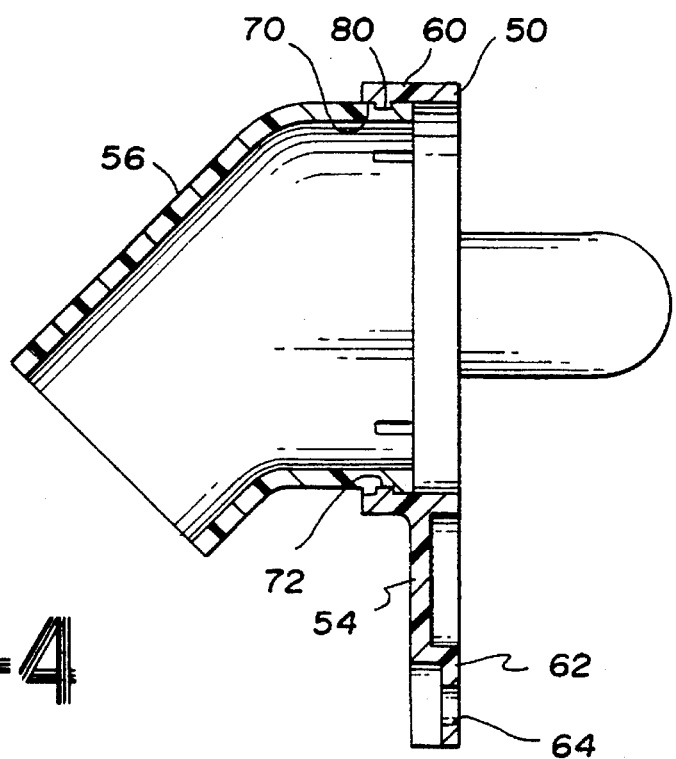
FIG. 4 is a side sectional view of the chip deflector.

Chip deflector 12 will now be described in more detail. Chip deflector 12 includes a base 54 and a nozzle 56. Base 54 includes an upper annular portion 60 and a planar flange portion 62. Flange portion 62 has a pair of spaced apart apertures 64 for receiving fasteners 66 (see FIG. 1) to secure base 54 to housing 14. Annular portion 60 has an annular opening 70 with a radially inwardly and circumferentially extending annular rib 72, best seen in FIG. 4. Also formed within annular portion 60 are two positioning recesses 73 and 74 located 90 degrees apart as shown if FIG. 2.

Nozzle 56 is hollow and elbow-shaped having proximate and distal ends portions 76 and 78. Formed on the outside of the outer periphery of end portion 76 is an annular groove 80. Annular groove 80 is sized such that first end portion 76 can be inserted within annular portion 60 of base 54 with annular rib 72 being received within annular groove 80. Four slits 82 are formed in proximate end portion 76 spaced along its circumference to allow proximate end portion 76 to deflect radially inwardly so that annular rib 72 can be received within annular groove 80.

Figure 2:
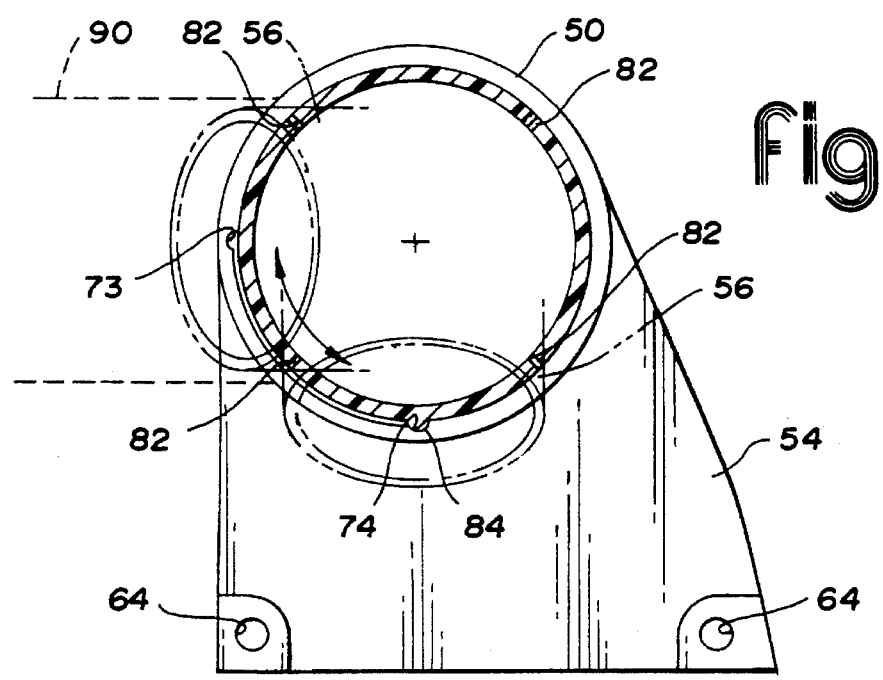
FIG. 2 is a side sectional view of the chip deflector having a base with a nozzle swivelably connected thereto, a portion of the nozzle is shown in phantom in two selected positions.

As shown in FIG. 2, a tab 82 is formed on the outside of proximate end portion 76. Tab 82 is received within retaining grooves 84 formed in base 54 to selectively hold nozzle 56 in the two positions shown in FIG. 2.

Figure 3:
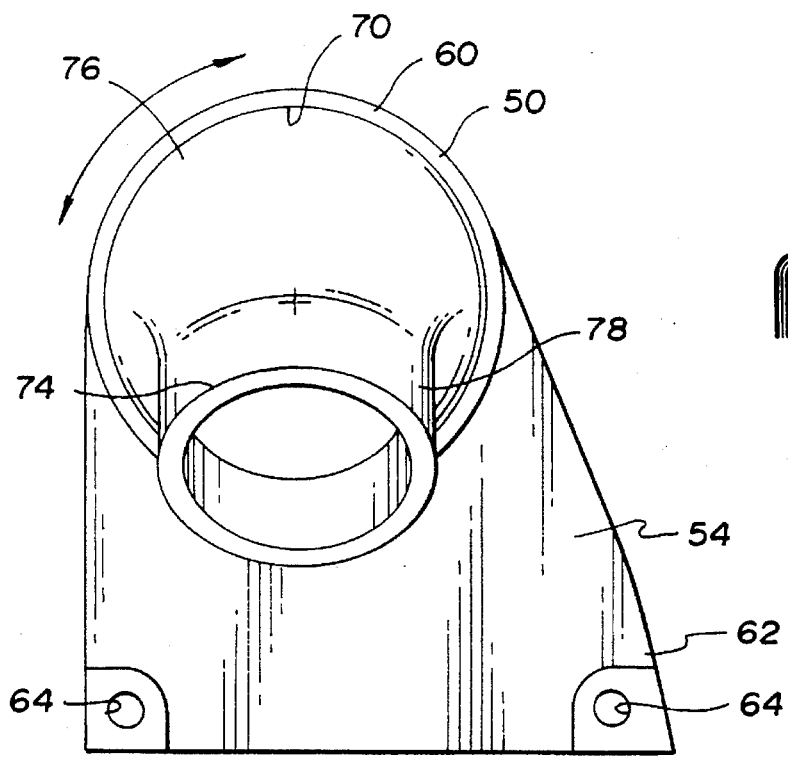
FIG. 3 is a side view of the chip deflector illustrating that the nozzle is swivelable.

This mating configuration allows nozzle 56 to be selectively swiveled or positioned relative to base 54 and housing 14. When nozzle 56 is positioned in a downward position as shown in FIGS. 2 and 3, chips planed from a workpiece are directed downwardly and away from a user using portable planer 10. Alternatively, nozzle 56 can be rotated with respect to base 54 and housing 14 such that a vacuum hose 90, as shown in phantom in FIG. 2, can be readily placed over nozzle 56 to collect chips blown or expelled from portable planer 10.

In operation, trigger 22 is depressed activating motor 24 which, in turn, causes impeller 26 and cutting blade assembly 28 to rotate. Planer 10 is slid across a workpiece during planing with blades 40 shaving high spots from the workpiece. The combination of impeller 26 and cutting blade assembly 28 rotating creates a stream of air exhausting chips through chip deflector assembly 12.

If the nozzle is orientated downwardly away from handles 16 and 20, and accordingly the user, the chips can be directed away from planer 10 and user and blown freely onto a floor. However, if it is desired to collect the shavings in a bag or with a vacuum cleaner, a vacuum hose or bag is attached over the end of nozzle 56. Nozzle 56 is preferably rotated to a horizontal position so that the vacuum or bag attaching to nozzle 56 will not interfere with the workpiece being operated upon. Nozzle 56 is preferably limited in its range of motion between a downward and a horizontal position to insure that the nozzle 56 cannot be aimed in the direction of a user's face during normal use.

While the foregoing specification of this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principals of the invention.

For example, rather than nozzle 56 being swivelably attached to base 54, it is possible the nozzle 56 can be attached in only discrete circumferentially spaced positions. Also, it is envisioned that nozzle 56 could be directly connected to housing 14 rather than requiring base 54. Again, this connection would allow nozzle 56 to moved such that the exhausted chips are directed downwardly or horizontally.

What is claimed is:

1. A portable planer for use by a user to plane chips of material from a workpiece, the planer comprising:

a housing having a first planing surface formed thereon for engaging a workpiece and having a planing chamber;

a motor supported by the housing;

a rotatable cutting blade assembly driven by the motor and positioned within the planing chamber, the blade assembly having at least one blade which is rotatable relative to the housing to engage and shave chips of material from the workpiece;

an exhaust port formed in the housing and in fluid communication with the planing chamber; and a chip deflector attached to the housing and in fluid communication with the exhaust port, the chip deflector defining a nozzle which is selectively swiveably positionable relative to the planar housing to deflect chips expelled from the planing chamber in a plurality of predetermined directions relative to the housing.

2. A portable planer for use by a user to plane chips of material from a workpiece, the planer comprising:

a housing having a first planing surface formed thereon for engaging a workpiece and having a planing chamber;

a motor supported by the housing;

a rotatable cutting blade assembly driven by the motor and positioned within the planing chamber, the blade assembly having at least one blade which is rotatable relative to the housing to engage and shave chips of material from the workpiece;

an exhaust port formed in the housing and in fluid communication with the planing chamber; and a chip deflector attached to the housing and in fluid communication with the exhaust port, the chip deflector defining a nozzle which is selectively swiveably positionable relative to the planar housing to deflect chips expelled from the planing chamber wherein the chip deflector includes a base portion affixed to the housing and a nozzle movably attached relative to the base portion to deflect chips in a plurality of predetermined directions relative to the housing.

3. The portable planer of claim 2 wherein:

the nozzle is swivelably attached to the base portion.

4. The portable planer of claim 1 wherein:

the chip deflector has a nozzle which is selectively positionable between a first position and a second position relative to the housing;

wherein the first position the nozzle deflects chips downwardly and away from a user operating the planer and in the second position the nozzle is positionable so that a vacuum hose or collector bag may be attached to the nozzle to collect chips without the vacuum hose or collector bag interfering with the workpiece or planer during planing of the workpiece.

5. The portable planer of claim 1 wherein:

the nozzle can be rotated through 90° from a downward position wherein chips are deflected downward toward a workpiece to a generally horizontal position wherein chips are deflected away from a user.

6. The portable planer of claim 1 further comprising:

a collection bag mounted to the chip deflector to collect chips expelled from the planer.

7. A method for constructing a portable planer which planes chips of material from a workpiece, the method comprising:

providing a planer housing having a planing cavity and a handle for moving the planar relative to a workpiece;

rotatably mounting a blade assembly within the planing cavity of the housing;

mounting a chip deflector having a nozzle upon the housing with the nozzle being in fluid communication with the planing cavity to receive chips expelled from the planing chamber;

selectively positioning the nozzle from a first position to a second position relative to the housing wherein the direction of chips expelled from the planer can be selectively determined.

8. The method of claim 7 wherein:

the nozzle is rotatably mounted relative to the planer housing.

* * * * *